US005797752A

United States Patent [19]

Umezawa

[11] Patent Number: 5,797,752

[45] Date of Patent: Aug. 25, 1998

[54] SYSTEM AND METHOD FOR NOTIFYING A TIME LIMIT AND EXTENSION OF USED PERIOD OF A KARAOKE APPARATUS

[75] Inventor: Satoru Umezawa, Shizuoka-ken, Japan

[73] Assignee: Yamaha Corporation, Hamamatsu, Japan

[21] Appl. No.: 634,248

[22] Filed: Apr. 18, 1996

[51] Int. Cl.[6] .................... G09B 5/08; G10H 1/36

[52] U.S. Cl. .................... 434/307 A; 434/307 R; 84/610; 463/25; 348/7

[58] Field of Search .................... 434/307 R–309, 434/318, 365; 84/477 R, 601, 603, 608, 609, 610, 625, 630, 631, 634, 645; 369/2, 48, 178, 192; 360/32, 33.01, 49, 70, 77.01; 348/6, 7, 12, 13, 478, 688, 571; 380/3; 381/51; 395/2.79, 154, 160, 141, 143, 147; 455/3.1, 5.1; 463/24, 25, 29, 40–42

[56] References Cited

U.S. PATENT DOCUMENTS

| | | | |
|---|---|---|---|
| 5,153,917 | 10/1992 | Kato | 434/307 A X |
| 5,326,104 | 7/1994 | Pease et al. | 463/29 X |
| 5,453,570 | 9/1995 | Umeda et al. | 434/307 A X |
| 5,489,103 | 2/1996 | Okamoto | 434/307 A X |
| 5,574,239 | 11/1996 | Kang et al. | 434/307 A X |
| 5,596,373 | 1/1997 | White et al. | 348/7 X |
| 5,609,486 | 3/1997 | Miyashita et al. | 434/307 A |
| 5,634,848 | 6/1997 | Tsuda et al. | 463/23 |

*Primary Examiner*—Joe Cheng

*Attorney, Agent, or Firm*—Pillsbury Madison & Sutro LLP

[57] ABSTRACT

A management apparatus stores a use start time and a use period of each of karaoke apparatuses. When the remaining time of any one of the karaoke apparatuses is 10 minutes or less, time limit information message is transmitted to the karaoke apparatus. The karaoke apparatus displays the time limit information message on its monitor so as to notify the user of the information. At the same time, the user in allowed to input the extension of the use period though a commander. If the input of the use period extension is performed, the karaoke apparatus transmits an extension requesting message to the management apparatus In response to the message, the management apparatus updates the data of the use period.

4 Claims, 8 Drawing Sheets

FIG. 8

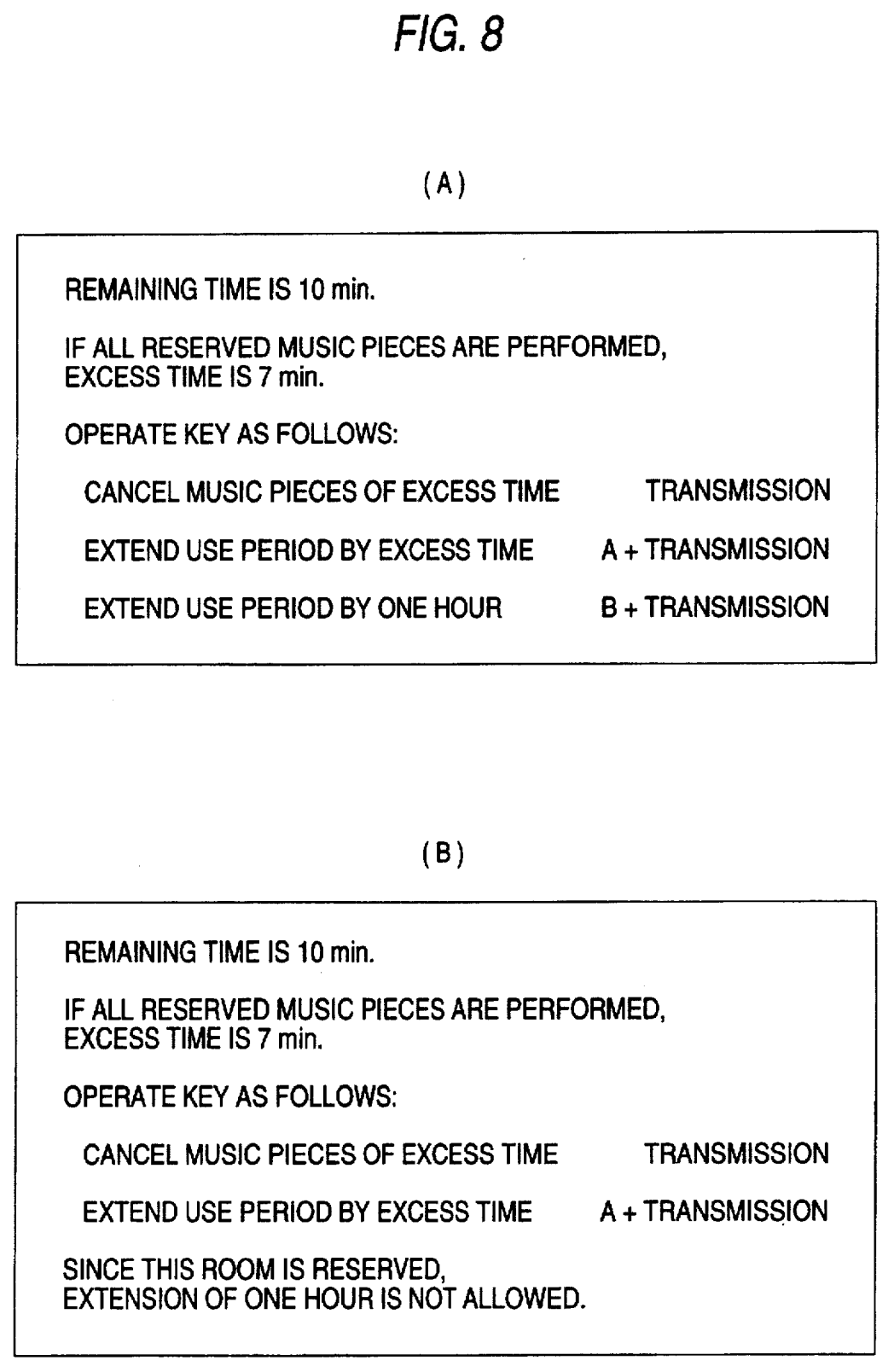

(A)

REMAINING TIME IS 10 min.

IF ALL RESERVED MUSIC PIECES ARE PERFORMED,
EXCESS TIME IS 7 min.

OPERATE KEY AS FOLLOWS:

| | |
|---|---|
| CANCEL MUSIC PIECES OF EXCESS TIME | TRANSMISSION |
| EXTEND USE PERIOD BY EXCESS TIME | A + TRANSMISSION |
| EXTEND USE PERIOD BY ONE HOUR | B + TRANSMISSION |

(B)

REMAINING TIME IS 10 min.

IF ALL RESERVED MUSIC PIECES ARE PERFORMED,
EXCESS TIME IS 7 min.

OPERATE KEY AS FOLLOWS:

| | |
|---|---|
| CANCEL MUSIC PIECES OF EXCESS TIME | TRANSMISSION |
| EXTEND USE PERIOD BY EXCESS TIME | A + TRANSMISSION |

SINCE THIS ROOM IS RESERVED,
EXTENSION OF ONE HOUR IS NOT ALLOWED.

SYSTEM AND METHOD FOR NOTIFYING A TIME LIMIT AND EXTENSION OF USED PERIOD OF A KARAOKE APPARATUS

BACKGROUND OF THE INVENTION

Field of the Invention

The invention relates to a karaoke apparatus and a karaoke system in which notification of a time limit and extension of a use period can be more efficiently performed in a so-called karaoke-box parlor (a parlor including a number of small rooms for karaoke).

A so-called karaoke-box parlor conducts its business in such a manner that a room (i.e., a karaoke box) provided with a karaoke apparatus is rent to a customer on an hour-by-hour basis. The customer enjoys the karaoke with renting the karaoke box by the hour, e.g., one hour, or two hours. The customer sometimes does not become aware of the time limit. For this reason, it is necessary to notice the customer that the time limit comes near, by some means.

Conventionally, this notification is conducted by means of an interphone or a telephone, or a staff member visits the room and informs the customer that the time is up. Either of the ways is required to be performed by the staff member for each karaoke box. This increases the work load on the staff member. In addition, the staff member must watch and compare the current time with the time limit, and hence there is a drawback that the notification cannot be performed accurately at a predetermined time, e.g. ten minutes or five minutes before.

SUMMARY OF THE INVENTION

It is an object of the invention to provide a karaoke apparatus and a karaoke system in which notification that the time limit comes near in displayed on a monitor and a customer can input extension of the use period in response to the display, thereby solving the above-mentioned problems.

The present invention is provided a karaoke apparatus comprising a monitor on which words and background scenes are displayed in parallel with a karaoke performance. The karaoke apparatus comprises: use period storing means for storing a use period at a start of a use of the karaoke apparatus; remaining time display means for, when a remaining time of the use period is equal to or less than a predetermined time during the use of the karaoke apparatus, displaying information indicative of it on the monitor; extension accepting means for, in response to the display of the remaining time display means, accepting an input of an extension period; and use period updating means for, when an, extension period is input, adding the extension period to the use period stored in the use period storing means and for updating the use period.

The present invention is provided a karaoke system comprising: a karaoke apparatus comprising a monitor on which words and background scenes are displayed in parallel with a karaoke performance; and a management apparatus connected to the karaoke apparatus via a line. In the karaoke system, the management apparatus comprises: use period storing means for storing a use period at a start of a use of the karaoke apparatus; and time limit transmission means for when a remaining time of the use period is equal to or less than a predetermined time during the use of the karaoke apparatus, transmitting time limit information to the karaoke apparatus, the karaoke apparatus further comprises: remaining time display means for, when the time limit information is received, displaying the time limit information on the monitor; extension accepting means for, in response to the display of the remaining time display means, accepting an input of an extension period; and extension requesting means for, when the extension period is input, transmitting the extension period as an extension requesting message, and the management apparatus further comprises use period updating means for, when the extension requesting message is received from the karaoke apparatus, adding the extension period to the use period stored in the use period storing means and for updating the use period.

The karaoke apparatus of the present invention can be in service only for a use period stored in the use period storing means. During the service, words and background scenes are displayed on the monitor in parallel with the karaoke performance, as usual. When a remaining time of the use period is equal, to or less than a predetermined time, information indicative of it is displayed on the monitor. In response to the display, the user (customer) decides whether the user stops the use or extends the use period. In the case where the user wants to extend the use period, an extension period is input in response to the display of the remaining time. In the karaoke apparatus, when the extension period is input in this way, the extension period is added to the use period stored in the use period storing means, so as to update the use period. As a result, the input of extension can be efficiently performed in parallel with the notification of the remaining time.

The karaoke system of the present invention comprises: a karaoke apparatus having a monitor on which words and background scenes are displayed in parallel with a karaoke performance: and a management apparatus connected to the karaoke apparatus via a line. The karaoke apparatus can be in service only for a use period stored in the use period storing means of the management apparatus. When a remaining time of the use period is equal to or less than a predetermined time during the service of the karaoke apparatus, the management apparatus transmits notification of it to the karaoke apparatus, and the karaoke apparatus displays the notification on the monitor. In response to the display, the user (customer) decides whether the user stops the use or extends the use period. In the case where the user wants to extend the use period, an extension period is input in response to the display of the remaining time. The karaoke apparatus transmits the extension period to the management apparatus as an extension requesting message. When the management apparatus receives the extension requesting message including the extension period, the extension period in added to the use period stored in the use period storing means, so as to update the use period. Even in a communication karaoke system of a centralized management type, therefore, notification of a time limit and extension of a time period can be performed without any direct contact by means of a telephone or by a staff member.

BRIEF DESCRIPTION OF THE DRAWINGS

FIG. 8 (A) and (B) are views showing display examples on a monitor of the karaoke apparatus.

DETAILED DESCRIPTION OF THE PREFERRED EMBODIMENTS

Figure 1:
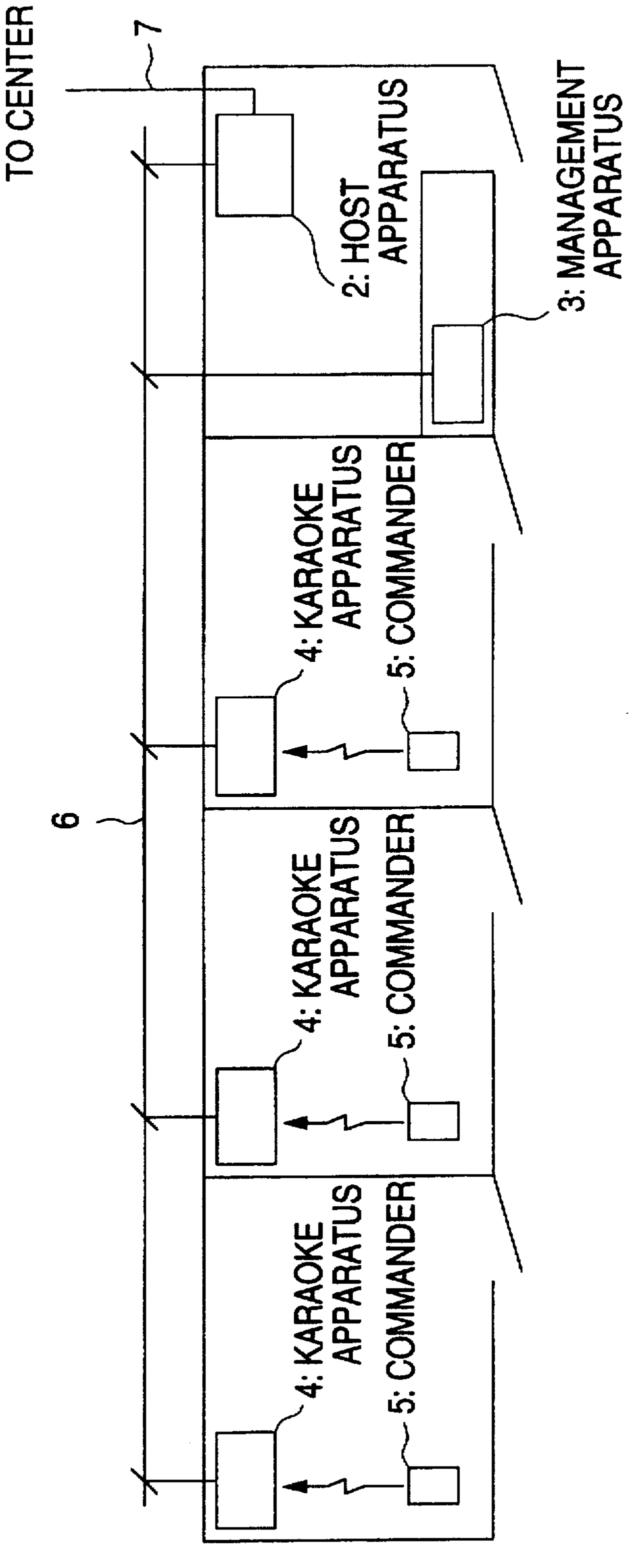
FIG. 1 is a diagram showing the configuration of a centralized management type communication karaoke system to which an embodiment of the invention is applied.

FIG. 1 is a diagram showing the configuration of a centralized management type communication karaoke system which in an embodiment of the invention.

The communication karaoke system is installed in a so-called karaoke-box parlor. Such a type of parlor consists of a management room having a service counter, and a plurality of karaoke boxes. The management room in provided with a host apparatus 2 and a management apparatus 3. Each karaoke box is provided with a karaoke apparatus 4. A commander 5 of an infrared remote control type is disposed in each karaoke apparatus 4.

The host apparatus 2, the management apparatus 3, and the plurality of karaoke apparatuses 4 are connected to each other via a coaxial cable 6. The transmission among the host apparatus 2, the management apparatus 3, and the karaoke apparatuses 4 is performed at a transmission rate of about 6 Mbps by using a CATV channel in a UHF band having a band of about 6 MHz. Addresses are respectively assigned to the host apparatus 2, the management apparatus 3, and the karaoke apparatuses 4. By using addresses attached to a message (packet), it is possible to identify an originating apparatus and a destination apparatus of the message.

In one of the karaoke boxes, when the user operates the commander 5 so that a music-piece code is transmitted, the karaoke apparatus 4 receives the music-piece code and performs a search operation so as to examine whether musical data corresponding to the music-piece code are stored or not in a hard disk drive 15 contained in the karaoke apparatus 4. If the data are stored, the data are written into an execution data storing area of a RAM 12, and the karaoke performance is started. If the data are not stored, a message including the music-piece code is edited, and the message is transmitted to the host apparatus 2 via the coaxial cable 6. When the host apparatus 2 receives the message, a storage device 31 is searched for musical data corresponding to the received music-piece code, and the searched musical data are transmitted to the karaoke apparatus 4. The karaoke apparatus 4 writes the received musical data into the execution data storing area of the RAM 12, and starts the karaoke performance.

When the use time limit for the customer comes near, the management apparatus 3 transmits a message of time limit information to the corresponding one of the karaoke apparatuses. The karaoke apparatus 4 which receives the message displays the message an a monitor 28, and enters a phase where the apparatus can receive a request of extension of the use period which is input from the commander 5. If the customer performs the extension input in response to the display, the karaoke apparatus 4 transmits an extension requesting message including an extension period, to the management apparatus 3. The management apparatus 3 extends the use period by the extension period included in the message.

Figure 2:
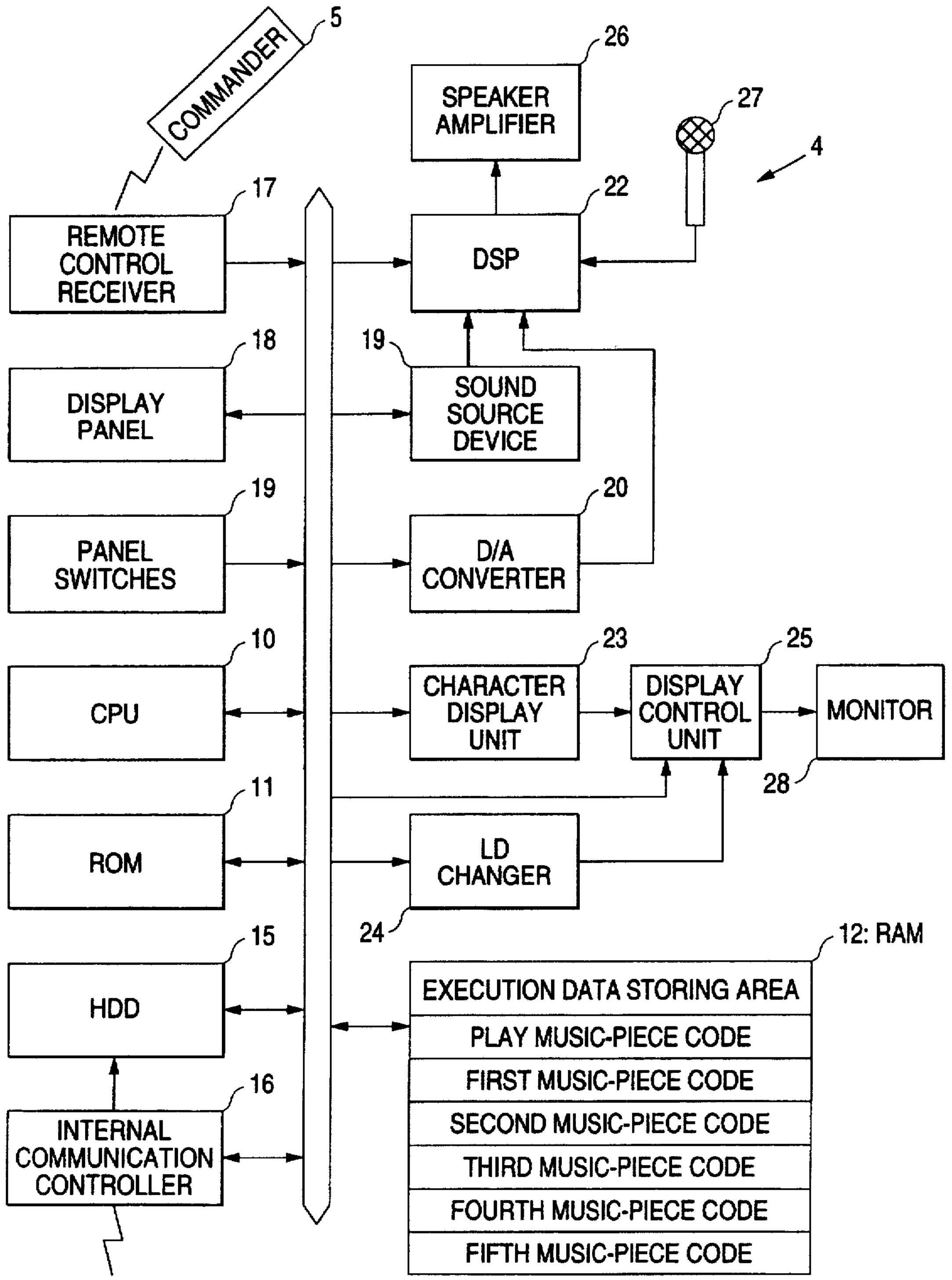
FIG. 2 is a block diagram of a karaoke apparatus used in the centralized management type communication karaoke system.

FIG. 2 is a block diagram of the karaoke apparatus 4. The karaoke apparatus is a so-called sound-source karaoke apparatus of communication type. In a sound-source karaoke apparatus, a sound-source device in driven by musical-sound data (sequence data) so that karaoke performance sounds are generated. A communication-type karaoke apparatus is a karaoke apparatus which is connected to the host apparatus 2 via a communication line, and downloads musical data including the musical-sound data from the host apparatus 2.

A ROM 11, the RAM 12, the hard disk drive (HDD) 15, an internal communication controller 16, a remote control receiver 17, a display panel 18, panel switches 19, a sound source device 20, a D/A converter 21, a DSP 22, a character display unit 23, an LD changer 24, and a display control unit 25 are connected via a bus to a CPU 10 which controls the operation of the whole apparatus.

The ROM 11 previously stores a system program, application programs, a loader, and font data. The system program is used for controlling the fundamental operation of the apparatus, and the transmission and reception of data to and from peripheral equipment. The application programs include programs for controlling peripheral equipment, a sequence program, and the like. When the karaoke performance is to be done, the sequence program is activated by the CPU 10 so that the generation of sounds and the reproduction of images are performed based on the musical data. The loader is a program for downloading musical data from the host apparatus 2. The font data are used for displaying words, a title of a music piece, etc. As the font data, fonts of various kinds of character types such as Ming type, and Gothic type are stored. An execution data storing area into which musical data are to be written in order to perform the karaoke performance, and a reservation table which stores music-piece codes input from the commander 5 are previously set in the RAM 12. The reservation table includes a play music-piece code storing area for storing the music-piece code of a music piece which is currently played, and a reserved music-piece code storing area for storing five music-piece codes in accordance with the FIFO system. The HDD 15 includes a musical data storing area for several tens to several hundreds of music pieces. In this storing area, musical data which are frequently requested are stored in the form of cash data.

The internal communication controller 16 is a controller for communication with the host apparatus 2 via the coaxial cable 6 and comprises a modem for modulating a manage to be transmitted into a predetermined band in the UHF band and for demodulating data from the received signal. The internal communication controller 16 contains a DMA circuit therein so that downloaded musical data are directly written into the HDD 15 without passing through the CPU 10.

The remote control receiver 17 receives an infrared signal transmitted from the commander 5, and reconstructs data. The commander 5 is provided with a plurality of key switches including numerical keys, alphabet keys, and a transmission key, and a buffer for temporarily storing successive key switch operations. When the user operates the numerical keys and alphabet keys in accordance with a predetermined procedure so as to input a code and then turns on the transmission key, the input code is output in the form of FM modulated infrared rays. The codes which are to be transmitted include a music-piece code, a period extension code, etc. The music-piece codes are shown in a title list (a book of contents) which is kept in the karaoke box. The period extension code is a code for requesting a period extension to the management apparatus 3 in an on-line manner, when the user is notified that the time limit comes near.

The display panel 14 in disposed on the front face of the karaoke apparatus, and used for displaying the code of a music piece which is currently played, and the number of reserved music pieces. The panel switches 19 are disposed in a front operating portion of the karaoke apparatus and include a music-piece code input switch, a key change switches, and the like.

The sound source device 20 produces a musical-sound signal based on musical data. The D/A converter 21 receives sound data which are ADPCM data and convert the data into a sound signal. The musical signal and the sound signal are supplied to the DSP 22. A microphone 27 is connected to the DSP 22. The DSP 22 applies effects such as reverberation, and echo to the musical signal and the sound signals input from the sound source device 20, the D/A converter 21, and the microphone 27. The kinds and extents of effects applied by the DSP 22 are controlled bas on DSP control data included in the musical data. The CPU 10 reads the DSP control data from the musical data, and supplies the read data to the DSP 22. The musical signal and the sound signals with effects are subjected to mixing, and then output to a loudspeaker and amplifier 26.

The loudspeaker 26 amplifies the signals and then outputs the signals as sounds.

The character display unit 23 generates character patterns of a title of a music piece, words, and the like, based on input character data. When time limit information is input from the management apparatus 3, the CPU 10 generates a character string corresponding to the contents of the information and supplies the character string to the character display unit 23. The character display unit 23 generates the character pattern. The LD changer 24 selects and reproduces video selection data which are determined based on genre data of a karaoke music piece, and the like, and then outputs the video selection data as video data. The character pattern and the video data are supplied to the display control unit 25. The display control unit 25 synthesizes these data by superimposition and displays then on the monitor 28.

Figure 3:
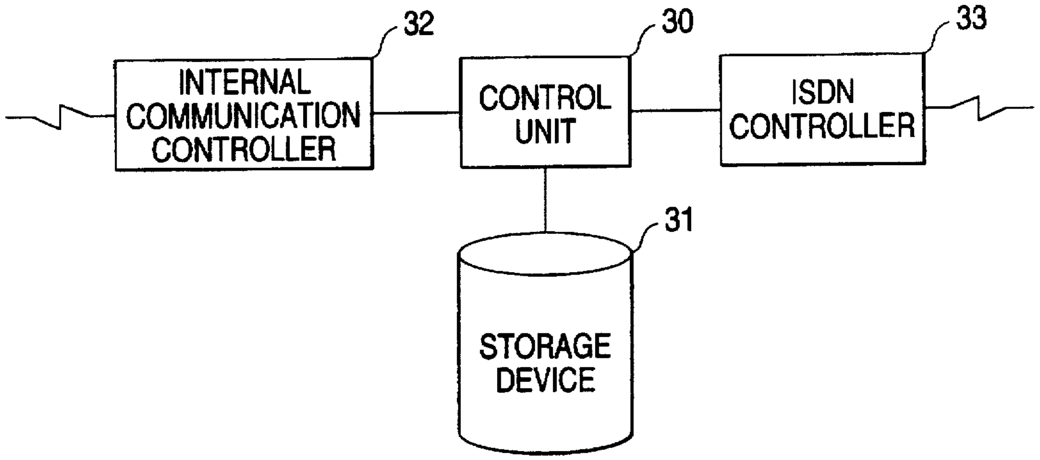
FIG. 3 in a block diagram of a host apparatus used in the centralized management type communication karaoke system.

FIG. 3 is a block diagram of the host apparatus. The apparatus has the large scale storage device 31. The storage device 31 is constituted by a hard disk drive of a large capacity, and hence can store musical-data of several thousands of music pieces. A control unit 30 controls the writing/reading of musical data of the storage device 31. An internal communication controller 32 is a device for controlling the transmission and reception of data to and from the karaoke apparatuses 4 via the coaxial cable 6. When a message which requests the download of musical data is transmitted from one of the communication karaoke apparatuses 4, the internal communication controller 32 receives the message based on the destination address, reads a music-piece code from the message, and supplies the music-piece code to the control unit 30. The control unit 30 performs the search on the storage device 31 based on the music-piece code, and reads out corresponding musical data. The read-out musical data are supplied to the internal communication controller 32. The internal communication controller 32 edits the musical data into a assuage (packet) by each block, and downloads the message to the karaoke apparatus from which the selection command is transmitted, via the coaxial cable 6.

The host apparatus 2 further comprises an ISDN controller 33. The ISDN controller 33 is connected to a distribution center via an ISDN line 7. The distribution center distributes musical data of new music pieces to host apparatuses which are connected to the line. The distribution is performed based on the schedule of the distribution center. The received musical data are written into the storage device 31.

Figure 4:
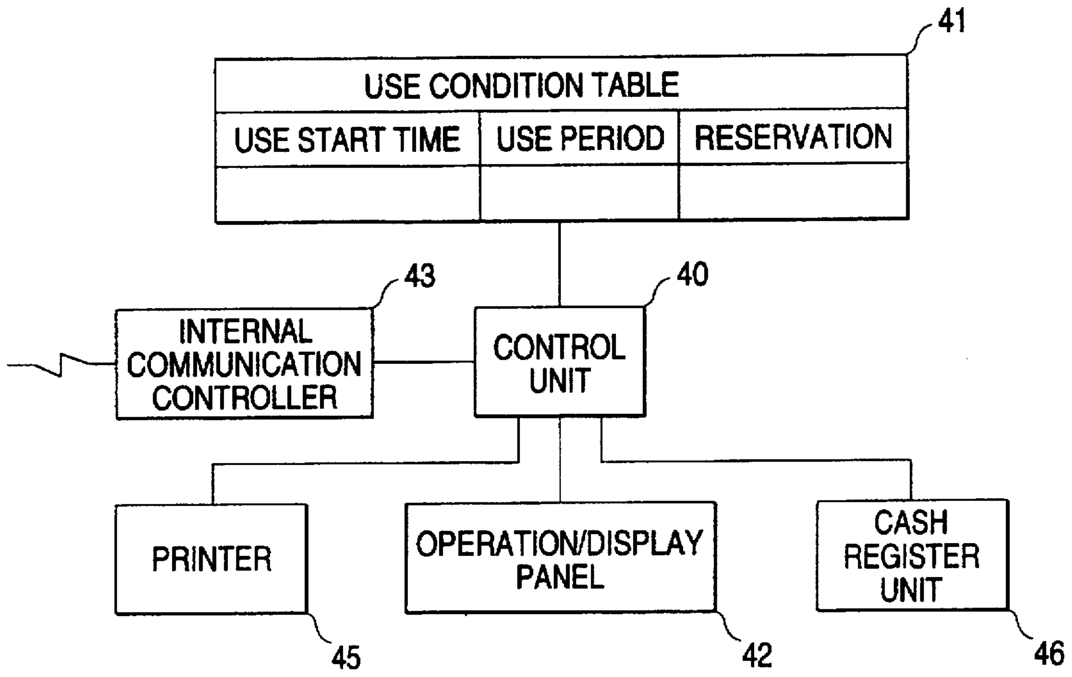
FIG. 4 is a block diagram of a management apparatus used in the centralized management type communication karaoke system.

FIG. 4 is a block diagram of the management apparatus 3. The management apparatus 3 is similar in appearance to a cash register and installed on the counter of the management room. A use condition table 41, an operation/display panel 42, an internal communication controller 43, a printer 45, and a cash register unit 46 are connected to a control unit 40. The use condition table includes a use start time storing area, a use period storing area, and a reservation flag which are provided for each room (karaoke box) of the parlor. The internal communication controller 43 contains a modem which is the same as that of the internal communication controller 32 of the host apparatus 2, and exchanges messages such as time limit information, a period extension request, and the like with the karaoke apparatuses 4. The control unit 40 periodically performs the search operation on the use condition table. If there is a room for which the remaining time is 10 minutes or less judging from the use start time and the use period, a time limit information message is transmitted to the karaoke apparatus 4 of the room. The time limit information message includes the notification that the remaining time is 10 minutes, the information about whether a next reservation is made for the room or not, etc. When the use of the room is finished, a fee is calculated in accordance with the use period, and the calculated fee is output through the display panel 42 and the printer 45.

Figure 5:
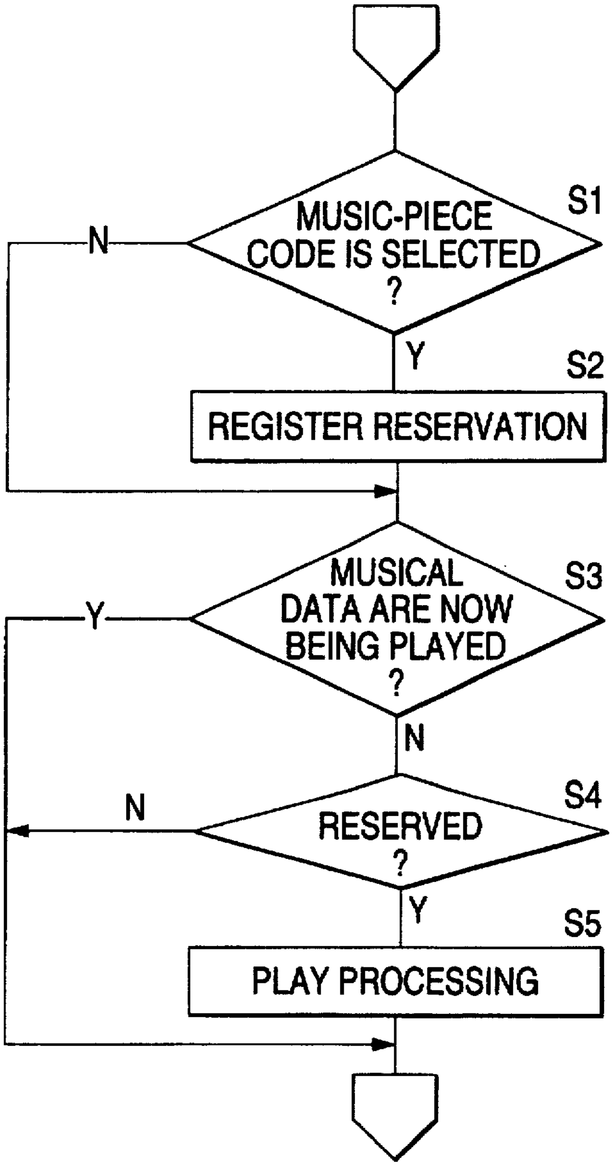
FIG. 5 is a flowchart illustrating the operation of the karaoke apparatus.
Figure 6:
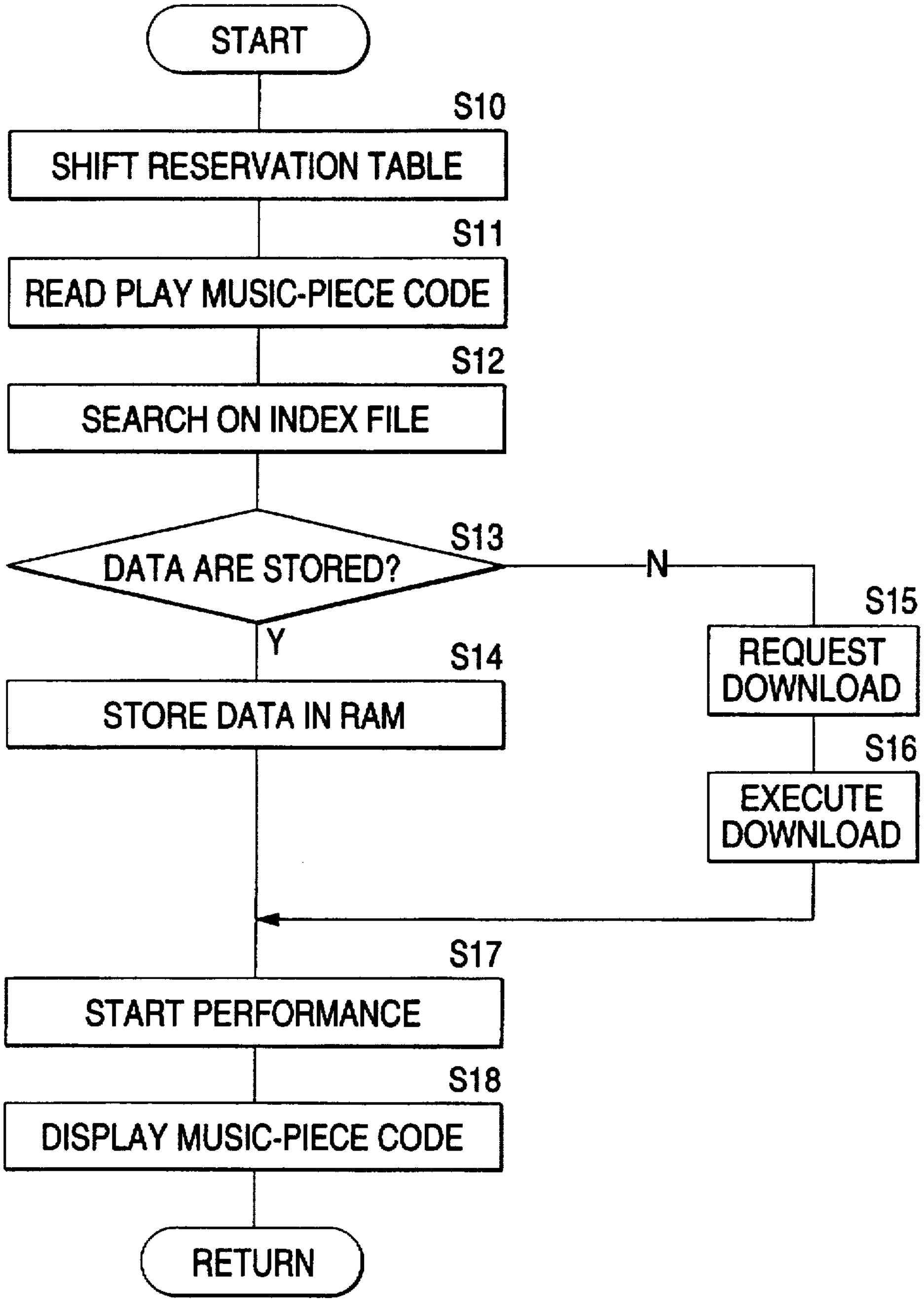
FIG. 6 in a flowchart illustrating the operation of the karaoke apparatus.
Figure 7:
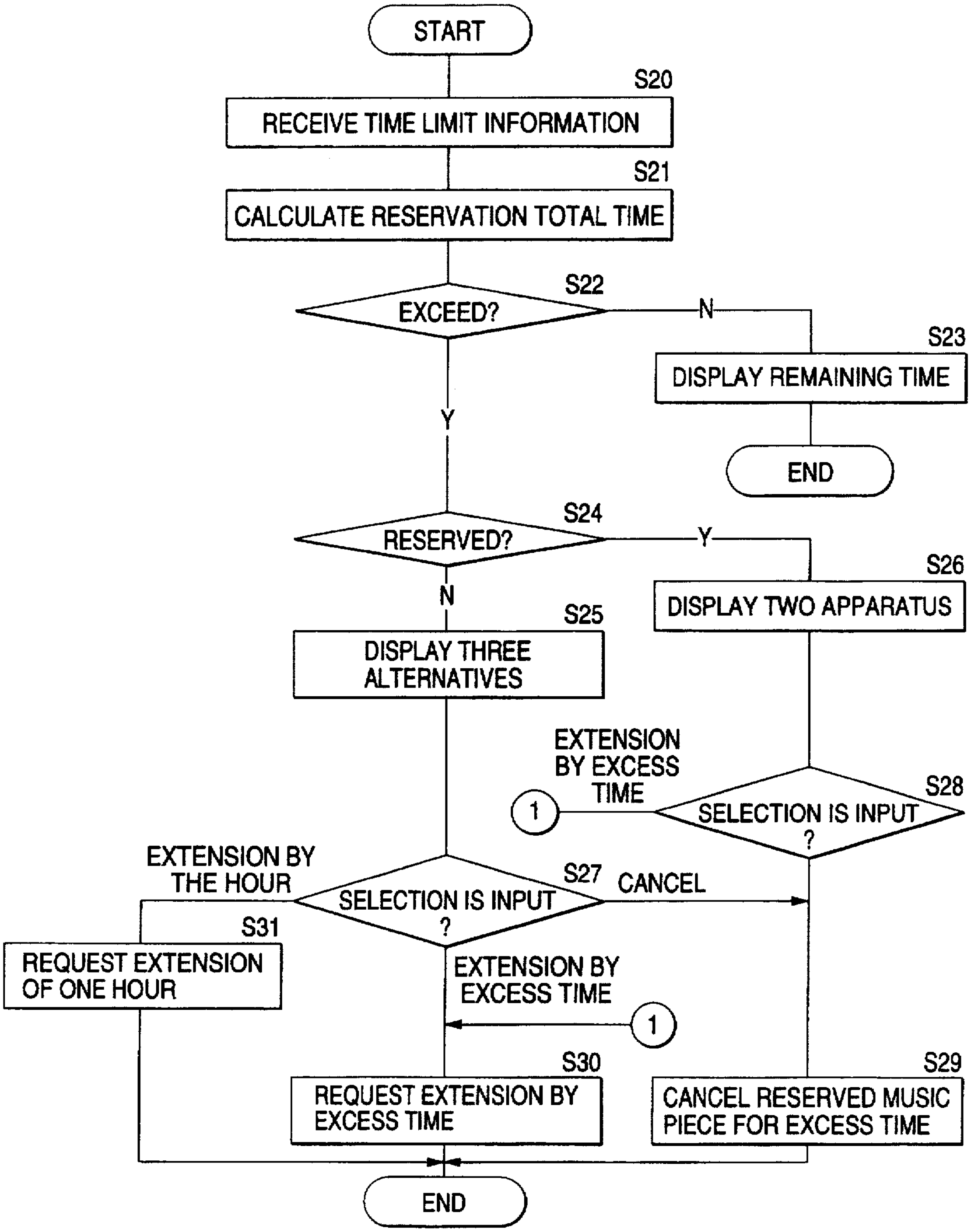
FIG. 7 in a flowchart illustrating the operation of the karaoke apparatus.

FIGS. 5 to 7 are flowcharts illustrating the operation of the karaoke apparatus 4. FIG. 5 shows part of the main routine, FIG. 6 shows a play processing operation, and FIG. 7 shows a processing operation when time limit information is input from the management apparatus 3.

Referring to FIG. 5, in step S1, it is judged whether a music-piece code is input from the commander 5 or not. A music-piece code is input by operating the commander 5 or the panel switch 19. When a music-piece code is input, the input music-piece code is stored at a lowest position of the reservation table (S2). If there is no reservation input, step S2 is skipped and the process proceeds to step S3. In step S3, it is judged whether musical data are now being performed (played) or not. In step S4, it is judged whether a music-piece code is stored in a reserved music-piece code storing area at the top position of the reservation table or not. That is, it is judged whether there is a reserved music piece or not. If no musical data are currently played and there exists a reservation, the play processing in performed based on the music-piece code at the top position (S5).

FIG. 6 is a flowchart showing the play processing operation. If the karaoke apparatus 4 is not in the play operation and a music-piece code is stored in the music-piece code storing area at the top position of the reservation table, the operation is executed. First, the whole reservation table including the play music-piece code storing area is shifted to upper positions so that the music-piece code at the top position in written into the performance music-piece code storing area. In the music-piece code storing area at the lowest position of the reservation tablet 0000 (no reservation) in written (S10). Next, a play music-piece code is read out (S11), and the search is performed on the index file by using the play music-piece coda (S12). If the musical data are stored in the HDD 15 (S13), the musical data are read out to the execution data storing area of the RAM 12 (S14). If the musical data are not stored in the HDD 15, a message for requesting the download of the musical data is transmitted to the host apparatus 2 (S15). In response to the request, the host apparatus 2 downloads the corresponding musical data (S16). As described above, the data transmission is performed at a transmission rate of 6 Mbps, so that musical data of one music piece (about 500 kB to 1 MB) are downloaded for about 1 second. The downloaded musical data are stored in the execution data storing area. When the data stored in the execution data storing area are read out based on a time clock signal, the karaoke performance in started (S17) and the code of the music piece which is now being played is displayed on the display panel 18 (S18).

FIG. 7 is a flowchart illustrating the operation when time limit information is received from the management apparatus. When the time limit information is received (S20), the reservation table is referred to and a total performance time period of music pieces which are now reserved (reservation total time) is calculated (S21). Then, it is judged whether the reservation total time exceeds the remaining time or not. If the reservation total time does not exceed the remaining time, only the remaining time is displayed (S23) and the process returns.

In contrast, if the reservation total time exceeds the remaining time, the room reservation information included in the time limit information is checked. If the room is not reserved by another new customer, three alternatives are displayed (S25) as shown in FIG. 8(A). Specifically, an alternative of canceling the reserved music piece(s) which corresponds to the excess time, that of extending the use period by the amount of the excess time, and that of extending the use period by the hour are displayed. If the room is reserved by another new customer, as shown in FIG. 8(B), two alternatives, i.e., an alternative of canceling the reserved music piece(s) which corresponds to the excess time, and that of extending the use period by the amount of the excess time are displayed (S26).

If the customer wants to cancel the reservation which corresponds to the excess time, the customer is required only to turn on the transmission key of the commander 5. If the customer wants to extend the use period by the amount of the excess time, the customer is required only to turn on the A key and the transmission key of the commander 5. If the customer wants to extend the use period for one hour, the customer is required only to turn an the B key and the transmission key of the commander 5.

When only the transmission key is turned on and the reserved music piece(s) which corresponds to the excess time is canceled, the code(s) of the music piece(s) which is scheduled to start after the expiration of the use period among the music-piece codes registered in the reservation table is canceled (S29). When the A key and the transmission key are turned on and the extension of the use period by the mount of the excess time is selected, an extension requesting message for the extension of the use period by the time is transmitted to the host apparatus 3 (S30). When the B key and the transmission key are turned on and the extension by one hour is selected, an extension requesting message for the extension of the use period by one hour is transmitted to the host apparatus 3 (S31).

When a reserved music piece is canceled before or during the performance thereof, the reservation total time is decreased. In such a case, it is sufficient to again perform the operation after stop S21. Alteratively, the reservation of music pieces after the execution of stops S29 and S30 may be inhibited. Also, the reservation of music pieces after the execution of step S23 may be allowed within the extended time limit.

In the above-described operation, even if a next reservation has been made for the room, the user is allowed to extend the use period to such an extent that the user can sing all the reserved music pieces. If the number of music pieces which can be reserved is as many as five, the resulting reservation total time is about 15 minutes. If the host apparatus 3 transmits the time limit information before 10 minutes of the time limit, therefore, the possible longest extension is about 5 minutes. As a result, such an extension does not degrade the service for the waiting customers, but enhances the service for the customer who is currently using the room.

The display shown in FIG. 8 is performed on the entire screen. If the display is performed by using part of the screen, the display does not disturb the karaoke performance and the singing of the user. In a karaoke apparatus having a plurality of monitors, the display is not displayed on a monitor which is to be viewed by the singing person, but displayed only on a monitor which is to be viewed by listening persons.

Figure 9:
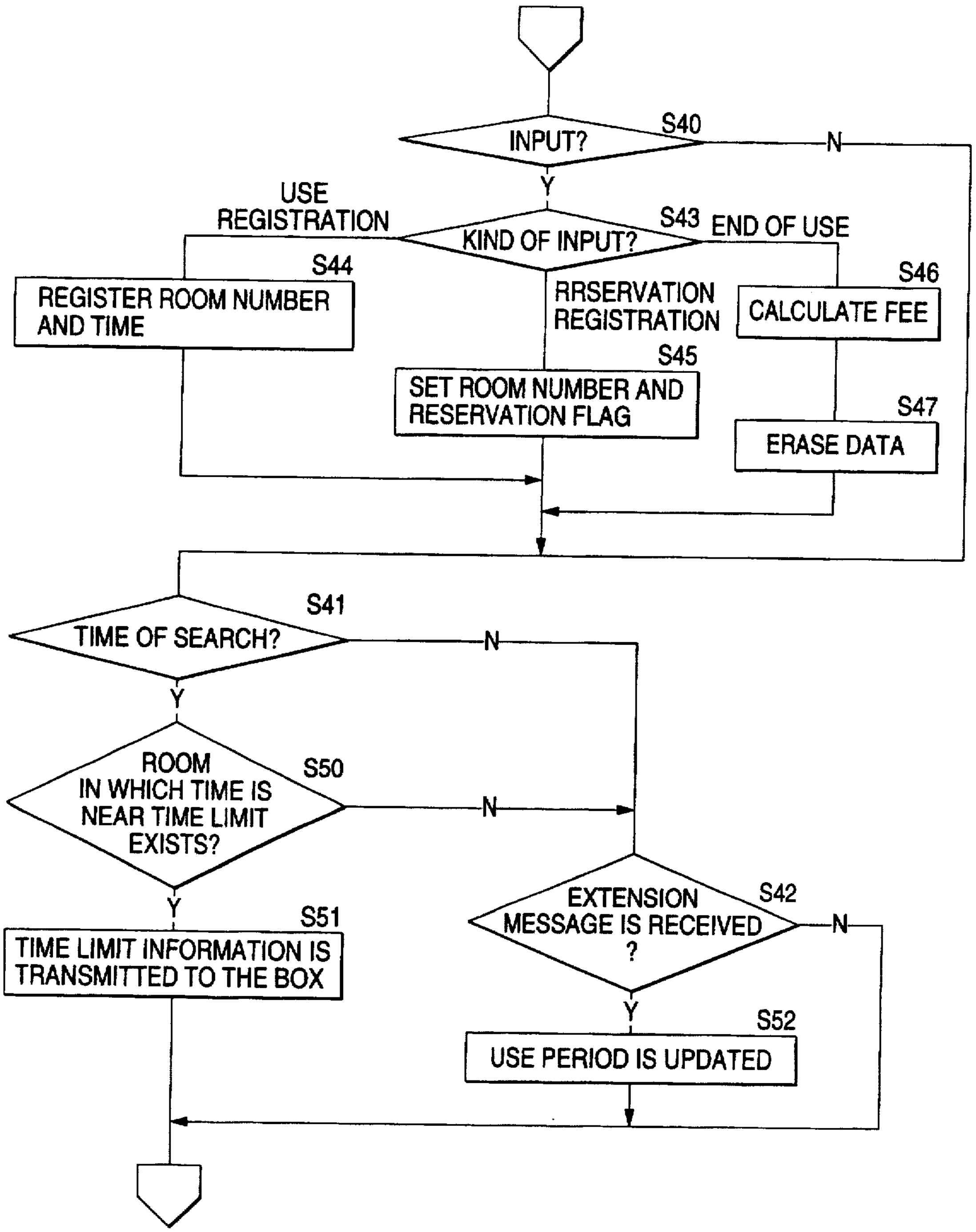
FIG. 9 is a flowchart illustrating the operation of the management apparatus.

FIG. 9 is a flowchart illustrating the operation of the host apparatus. It is judged whether any input is performed by a staff member through a keyboard or not (S40), whether a time when the use condition table is to be searched is reached or not (S41), and whether an extension requesting message of use period is received from any one of the karaoke apparatuses (S42). If there is any input from the keyboard, the process proceeds from step S40 to step S43 where the kind of input data are determined. If the input data are use registration data, a use start tine and a use period are registered in a list of the room number which is started to be used. In addition, if the reservation flag corresponding to the room number is set, the flag in reset (S44). If the input data are reservation registration data, the reservation flag for the reserved room number is set (S45). If the input data are use termination data, the fee is calculated based on the use period and then output (S46), and the use start time and use period data of the corresponding room number are erased (S47).

If it is judged in step S41 that the time is reached at which the use condition table is to be searched, the process proceeds to step S50. The search of the use condition table is performed at time intervals of one minute or several minutes. As the result of the search, if there is a room for which the remaining tine (time limit) of the use period is 10 minutes or less, a message of time limit information is transmitted to the karaoke apparatus 4 in the room (S51). As described above, the contents of the time limit information include the use remaining time and the reservation condition.

If the use period extension requesting message is received in step S42 from one of the karaoke apparatuses 4, the use period of the room in which the karaoke apparatus 4 is located is updated (S52).

The timing at which the time limit information message is transmitted is not limited to the remaining time of 10 minutes. In the above-described operation, the use period message is transmitted every time when the table search is performed after the remaining time of the use period is 10 minutes or less. Alternatively, a flag which indicates that the message has been transmitted may be set for the karaoke apparatus to which the time limit information message is transmitted once, so that the time limit information message is not be transmitted again. In this case, if the use period is extended by one hour, the flag which indicates that the transmission is finished is reset so that the time limit information message is transmitted after an elapse of one hour, i.e., at the timing when the remaining time is 10 minutes.

In the embodiment, the centralized management type commutation karaoke system has been described. Even in the case where the karaoke apparatus in each karaoke box is not of the on-line type, but of a stand-alone type if each karaoke apparatus individually and independently performs the time management, the notification of tine limit and the acceptance of time extension can be individually performed.

In the embodiment, the extension of the use period can be accepted only during the period when the remaining time is displayed. Alternatively, independently of the display of the remaining time, the extension may be accepted at any desired timing.

As described above, according to the invention, when the end of the use period comes near, the notification is displayed on the monitor, so that the customer who is now singing can be surely notified of the time limit. In addition, since the extension input of the use period is accepted in response to the display, the procedure of extension can be simplified, and there in no case where the extension is performed in haste after the time limit is over.

According to the invention, the time limit information is transmitted from the management apparatus, and hence it is unnecessary for a staff member to inform the customer of the time limit by using a telephone or by directly visiting the room. As a result, the work load on the staff member is reduced. In addition, since the extension request is transmitted to the management apparatus in the on-line manner, the management can be performed efficiently.

What is claimed is:

1. A karaoke apparatus comprising:

a monitor on which words and background scenes are displayed in parallel with a karaoke performance;

use period storing means for storing a use period at a start of a use of said karaoke apparatus;

remaining time display means for displaying information indicative of it on said monitor when a remaining time of the a use period is equal to or less than a predetermined time during the use of said karaoke apparatus;

extension accepting means for accepting an input of an extension period in response to the display of said remaining time display means; and use period updating means for adding the extension period to the use period stored in said use period storing means and for updating the use period when an extension period is input.

2. A karaoke system comprising a karaoke apparatus comprising a monitor on which words and background scenes are displayed in parallel with a karaoke performance; and a management apparatus connected to said karaoke apparatus via a line, said management apparatus including:

use period storing means for storing a use period at a start of a use of said karaoke apparatus; and time limit transmission means for transmitting time limit information to said karaoke apparatus when a remaining time of the use period is equal to or less than a predetermined time during the use of said karaoke apparatus, wherein said karaoke apparatus includes:

remaining time display means for, when the time limit information is received, displaying the time limit information on said monitor;

extension accepting means for accepting an input of an extension period in response to the display of said remaining time display means; and extension requesting means for transmitting the extension period as an extension requesting message when the extension period is input, wherein said management apparatus includes:

use period updating means for adding the extension period to the use period stored in said use period storing means and for updating the use period when the extension requesting message is received from said karaoke apparatus.

3. A method for notifying a time limit and extension of used period of a karaoke apparatus comprising the steps of:

storing a use period at a start of a use of said karaoke apparatus;

displaying information indicative of it on a monitor when a remaining time of the use period is equal to or less than a predetermined time during the use of said karaoke apparatus;

accepting an input of an extension period in response to the display of said remaining time; and adding the extension period to the use period stored and for updating the use period when an extension period is input.

4. A method for notifying a time limit and extension of used period of a karaoke apparatus comprising the steps of:

storing a use period at a start of a use of said karaoke apparatus in a use period storing means;

transmitting time limit information to said karaoke apparatus when a remaining time of the use period is equal to or less, than a predetermined time during the use of said karaoke apparatus;

displaying the time limit information on a display means when the time limit information is received;

accepting an input of an extension period in response to the display of said remaining time on said display means;

transmitting the extension period as an extension requesting message when the extension period is input;

adding the extension period to the use period stored in said use period storing means and for updating the use period when the extension requesting massage in received from said karaoke apparatus.

* * * * *